Patented Sept. 3, 1935

2,013,069

UNITED STATES PATENT OFFICE 2,013,069

DYESTUFFS OF THE OXAZINE SERIES

Wilhelm Schepss, Leverkusen-I. G.-Werk, Germany, assignor to General Aniline Works, Inc., New York, N. Y., a corporation of Delaware No Drawing. Application February 5, 1934, Serial No. 709,869. In Germany February 10, 1933

3 Claims. (Cl. 260—28)

The present invention relates to new dyestuffs of the oxazine series, more particularly it relates to dyestuffs which may be represented by the probable general formula:

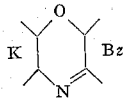

wherein K stands for the radical of a carbazole compound and Bz stands for a radical of the benzene series containing in p-position to the nitrogen atom of the oxazine nucleus an alkylated, aralkylated or arylated amino group.

My new dyestuffs are obtainable according to the known methods of preparing dyestuffs of the oxazine series, for example, by condensing a hydroxycarbazole compound containing a free ortho-position with respect to the hydroxy group with a nitroso-benzene compound with a free ortho-position with respect to the nitroso group and containing an alkylated, arylated or aralkylated amino group in para-position to the nitroso-group, for example, by heating in a suitable solvent, such as alcohol.

As hydroxycarbazole compounds coming into consideration for the purpose of the invention there may be mentioned by way of example 1-hydroxycarbazole, 2 - hydroxycarbazole, 3 - hydroxycarbazole, 2,8-dihydroxycarbazole, 1,8-dihydroxycarbazole, further their N-substitution products, such as the N-alkyl-, N-benzyl-, N-phenyl-substitution products, or their C-substitution products, such as their sulfonic and carboxylic acids. Besides, there may be used in my process such hydroxycarbazoles having condensed to one benzene nucleus a benzo nucleus. All these compounds are included in the term hydroxycarbazole compounds.

As nitroso compounds suitable for my invention there may be mentioned by way of example nitroso-benzene containing in para-position to the nitroso group an amino group the hydrogen atoms of which being wholly or partially substituted by alkyl groups including hydroxyalkyl groups, aryl groups or aralkyl groups, and which nitroso-benzene compounds may bear further substituents in the benzene nucleus, for example alkyl or halogen.

My new dyestuffs are generally dark crystalline powders, difficultly to easily soluble in water, and dyeing tanned cotton generally blue to greenish-blue to greyish-black shades of good fastness properties. Those which are insoluble in water are suitable for being used as pigments.

The invention is illustrated by the following examples, without being limited thereto:

Example 1.—10 parts by weight of 2-hydroxycarbazole are dissolved in 80 parts by weight of alcohol with boiling, and into the boiling solution 11 parts by weight of nitrosodimethylaniline-hydrochloride are introduced in small portions. The dyestuff formed separates; it is sucked off after refluxing for several hours the reaction mixture and repeatedly washed with alcohol. It is obtained in form of a heavy, sandy blue powder which is soluble in glacial acetic acid with a clear blue coloration, dyeing tanned cotton clear blue shades of a good fastness to washing and excellent fastness to light. The dyestuff probably corresponds in form of its hydrochloric acid salt to the following formula:

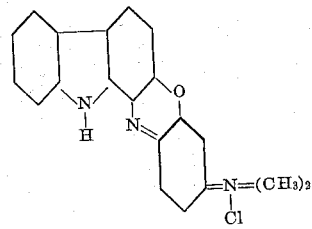

By substituting the nitrosodimethylaniline-hydrochloride by the equivalent quantity of the hydrochloride of para-nitrosodiethanolaniline, there is obtained a dyestuff of the probable formula:

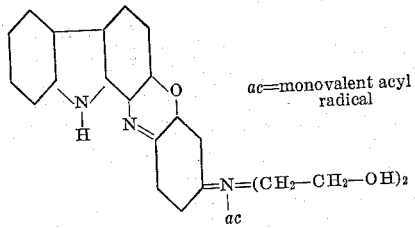

ac=monovalent acyl radical being soluble in hot water and having otherwise the same properties as the dyestuff obtained in accordance with paragraph 1.

By substituting the para-nitrosodimethylaniline-hydrochloride by the equivalent quantity of para-nitrosodiethylaniline or by 1-methylamino-2-methyl-4-nitrosobenzene, or by 1-dimethylamino-3-chloro-4-nitrosobenzene, there are obtained dyestuffs of similar properties.

When substituting the 2-hydroxycarbazole by 1-hydroxycarbazole, or 1,8-dihydroxycarbazole or 2,8-dihydroxycarbazole, there are obtained dyestuffs dyeing tanned cotton greyish-black shades.

Example 2.—10 parts by weight to 9-methyl-2-hydroxycarbazole are dissolved in 80 parts by weight of alcohol with boiling, and into the boiling solution there are introduced in small portions 12 parts by weight of nitrosodiethanolaniline-hydrochloride. After refluxing for 8 hours the reaction mass is allowed to cool, the dyestuff formed is sucked off and washed with cold alcohol. The dyestuff having probably the following formula:

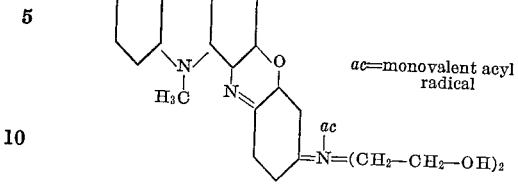

has the same fastness properties as the second dyestuff described in Example 1. It is also suitable for being used in the tannin discharge printing.

A dyestuff having similar properties is obtained when substituting the 9-methyl-2-hydroxycarbazole by an equivalent quantity of 9-ethyl-2-hydroxycarbazole. By substituting the 9-methyl-2-hydroxycarbazole by 9-benzyl- or 9-phenyl-2-hydroxycarbazole, there are obtained dyestuffs which are somewhat more difficultly soluble.

*Example 3.*—Into a boiling suspension of 8 parts by weight of 2-hydroxycarbazole-3-carboxylic acid in 80 parts by weight of ethylalcohol there are introduced in small portions 7 parts by weight of nitrosodiethanolaniline-hydrochloride. After refluxing for 8 hours, the mass is allowed to cool, and the dyestuff formed is filtered with suction and washed with cold alcohol. It probably corresponds to the following formula:

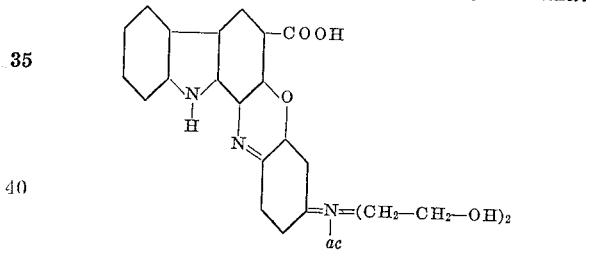

Tanned cotton and chrome-mordanted cotton are dyed blue shades of good fastness to soaping and excellent fastness to light.

A dyestuff having similar properties is obtained when substituting the 2-hydroxycarbazole-3-carboxylic acid by the 2-hydroxycarbazole-7-sulfonic acid. The dyestuff is suitable for producing barium lakes therefrom.

*Example 4.*—10 parts by weight of 2-hydroxy-7,8-benzocarbazole are dissolved in 80 parts by weight of alcohol with boiling, and into the boiling solution there are introduced in small portions 12 parts by weight of nitrosodiethanolaniline-hydrochloride. Boiling is continued for 6 hours; after cooling, the dyestuff separated is filtered and washed twice with cold alcohol. In its free state it has the following formula:

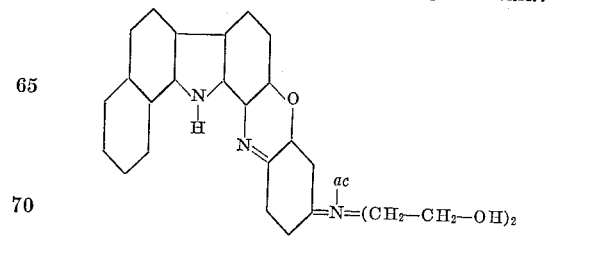

It dyes tanned cotton greenish-blue shades.

By substituting the 2-hydroxy-7,8-benzocarbazole by an equivalent quantity of 2-hydroxy-5,6-dihydrobenzocarbazole, there is obtained a dyestuff of the probable formula:

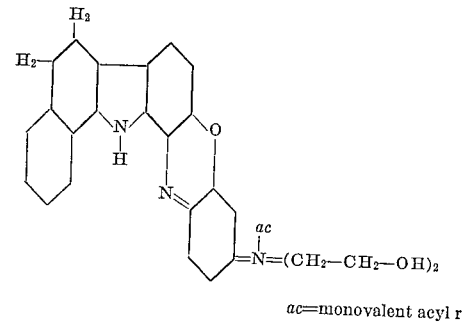

exerting similar properties.

I claim:

1. Oxazine dyestuffs of the general formula:

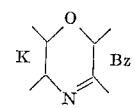

wherein K stands for the radical of a carbazole compound and Bz stands for a radical of the benzene series, containing in para-position to the nitrogen atom of the oxazine nucleus an alkylated amino group, being generally dark crystalline substances, dyeing tanned cotton generally blue to greenish-blue to greyish-black shades of good fastness properties.

2. Oxazine dyestuffs of the general formula:

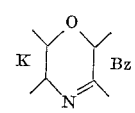

wherein K stands for the radical of a carbazole compound and Bz stands for a radical of the benzene series, containing in paraposition to the nitrogen atom of the oxazine nucleus a dialkylamino group in which the alkyl may bear as substituent a hydroxy group, being generally dark crystalline substances, dyeing tanned cotton generally blue to greenish-blue to greyish-black shades of good fastness properties.

3. The oxazine dyestuff of the following formula:

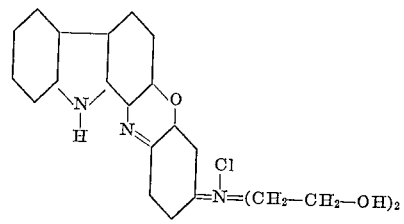

being soluble in hot water, and dyeing tanned cotton clear blue shades of good fastness to washing and excellent fastness to light.

WILHELM SCHEPSS.